2,824,871
Patented Feb. 25, 1958

2,824,871

STEROID COMPOUNDS AND PROCESS

Robert H. Levin and Barney J. Magerlein, Kalamazoo, Mich., assignors to The Upjohn Company, Kalamazoo, Mich., a corporation of Michigan No Drawing. Application November 29, 1951
Serial No. 259,008

15 Claims. (Cl. 260—239.55)

This invention relates to a novel process for the hydrogenation and also subsequent hydrolysis of certain steroid ketals and is more particularly concerned with a process for the hydrogenation of 3-hydroxypregnane-11,20-dione-20-ketals and also subsequent hydrolysis of the resulting novel 3,11β-dihydroxypregnane-20-one-20-ketals to produce 3,11β-dihydroxypregnane-20-ones, and with the novel 3,11β-dihydroxypregnane-20-one-20-ketals. This application is a continuation-in-part of our copending applications, Serial Number 256,824, filed November 16, 1951, and Serial Number 259,007, filed November 29, 1951, both now abandoned.

It is an object of the present invention to provide certain steroid compounds having an 11-hydroxy substituent which is of the beta or normal stereochemical configuration. It is another object of the present invention to provide a process for the preparation of 3,11β-dihydroxypregnane-20-one-20-ketals and also hydrolysis of these 3,11β-dihydroxypregnane-20-one-20-ketals to produce 3,11β-dihydroxypregnane-20-ones. An additional object of the present invention is to provide the novel 3,11β-dihydroxypregnane-20-one-20-ketals. Other objects of the present invention will be apparent to those skilled in the art to which this invention pertains.

The novel 3,11β-dihydroxypregnane-20-one-20-ketal compounds and the known 3,11β-dihydroxypregnane-20-ones produced by the method of the present invention are useful in the synthesis of certain physiologically-active steroids containing an 11β-hydroxy group, such as is present in the cortical hormones 17α-hydroxycorticosterone and corticosterone, as shown by Von Euw, Lardon, and Reichstein, Helv. Chim. Acta, 27, 1287 (1944). Likewise, the novel process of the present invention has utility in the synthesis of cortical hormones containing the 11β-hydroxy group since it relates to the hydrogenation of the 11-keto substituent of 3-hydroxypregnane-11,20-dione-20-ketal. The importance of this novel process and the novel 11β-hydroxy ketal compounds produced is emphasized by the acute shortage of adrenal cortical hormones and the absence of any present suggestion for alleviation of the said shortage except through organic synthesis.

According to the novel hydrolysis method of the present invention, a 3,11β-dihydroxypregnane-20-one-20-alkane diol ketal, wherein the 20-ketal group contains from two to eight carbon atoms, inclusive, is hydrolyzed by a process which includes mixing an acid hydrolyzing agent and the 11β-hydroxy steroid ketal in an aqueous organic solvent mixture, the organic solvent of which is non-reactive under the conditions of reaction, at a temperature between about zero degrees centigrade and the boiling point of the reaction mixture, and separating the 3,11β-dihydroxypregnane-20-one from the reaction product.

The novel compounds of the present invention are the 3,11β-dihydroxypregnane-20-one-20-ketals, having the following structural formula:

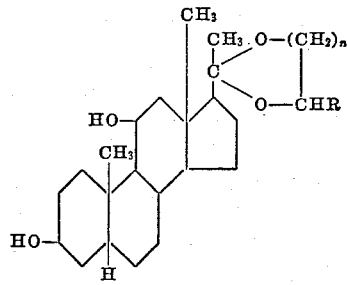

wherein R is selected from the group consisting of hydrogen and lower-alkyl groups, such as, for example, methyl, ethyl, propyl, isopropyl, butyl, 1-methylpropyl, amyl, hexyl and the like, and n is an integer from one to two, inclusive. Of these compounds, the lower alkylene glycol ketals, formed from the 1,2-alkane-diols, are preferred. The configuration of the hydroxy group at the 3-position includes both alpha and beta forms in the above formula and throughout the specification and appended claims, unless otherwise specified.

The novel 11β-hydroxy ketal compounds of the present invention are prepared by a reduction process which includes mixing a reducing agent such as, for example, lithium aluminum hydride, in excess of the amount theoretically required, and a starting 3-hydroxypregnane-11,20-dione-20-alkane diol ketal, in an organic solvent which is non-reactive under the conditions of reaction, at a temperature between about zero and about 100 degrees centigrade, hydrolyzing the reaction product and separating the 3,11β-dihydroxypregnane-20-one-20-ketal thus-produced.

The starting compounds employed in the method of the present invention are the 3-hydroxypregnane-11,20-dione-20-ketals having the following structural formula:

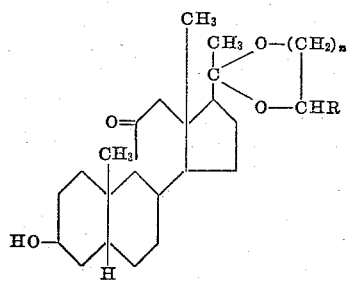

wherein R is selected from the group consisting of hydrogen and lower-alkyl such as, for example, methyl, ethyl, propyl, iso propyl, butyl, 1-methylpropyl, amyl, hexyl and the like, n is an integer from one to two, inclusive, and the configuration of the 3-hydroxy group is alpha or beta.

The starting ketals in turn are prepared by a process which includes mixing, in a proportion of at least about one mole to one, a ketal forming reagent selected from the group consisting of alkane-1,2-diols and alkane-1,3-diols such as, for example, ethylene glycol, propane-1,2-diol, propane-1,3-diol, hexane-1,3-diol, octane-1,2-diol and the like, and a 3-hydroxypregnane-11,20-dione in the presence of an organic sulfonic acid or a mineral acid, at a temperature below about 200 degrees centigrade, to cause conversion of the 20-keto group to a 20-ketal group. The 3α-hydroxypregnane-11,20-dione is a compound known in the prior art. The procedure utilized in the formation of the starting materials is illustrated more fully in the preparations.

In carrying out the novel reduction process of the present invention to produce a novel 3,11β-dihydroxypregnane-20-one-20-ketal, a starting 3-hydroxypregnane-11,20-dione-20-ketal is admixed, using either order of addition, with at least the theoretical amount of reducing agent such as, for example, lithium aluminum hydride, sodium borohydride, or lithium borohydride, in an organic solvent which is non-reactive under the reaction conditions, at a temperature below about 100 degrees centigrade, preferably between about zero and about 80 degrees centigrade. Ordinarily, it is preferred to use an excess of reducing agent, preferably between about five and about twenty moles of reducing agent per mole of the starting 3-hydroxypregnane-11,20-dione-20-ketal. The time required for the reaction is not critical and may be varied between about fifteen minutes and about eight hours, the length of time being dependent, of course, upon the solvent, the temperature, and the reducing agent. The mixture is then hydrolyzed in conventional manner, preferably by the addition of an ice and water mixture, dilute mineral acid, or the like, and the 3,11β-dihydroxypregnane-20-one-20-ketal separated from the reaction mixture by conventional procedure such as filtration or extraction. The solvent used is one which is not reactive under the reaction conditions, and for this purpose many are suitable, such as, for example, ether, benzene, tetrahydrofuran, dioxan, methanol, ethanol, isopropyl alcohol and the like.

In carrying out the hydrolysis process of the present invention, a novel 3,11β-dihydroxypregnane-20-one-20-ketal obtained by the above reduction process, in an organic solvent which is non-reactive under the conditions of reaction, such as, for example, methanol, ethanol, acetone, isopropyl alcohol, methyl ethyl ketone, dioxane, benzene, ether, and the like, or mixtures of these solvents, with benzene, ether, or a benzene-ether mixture being preferred, is admixed with an acid hydrolyzing agent and water. The preferred acid hydrolyzing agents are the mineral acids, such as, for example, hydrochloric acid, sulfuric acid, phosphoric acid, and the like. The concentration of the hydrolyzing agent is not critical, and solutions having a pH of about two up to solutions concentrated with respect to the acid are acceptable, the range from 0.1 normal to two normal being preferred. The rate of reaction is greater when more concentrated acids are employed, although in such cases it is advisable to employ a smaller amount of the acid used. The order of addition of the reactants is not critical and any order of admixture of the starting ketal, hydrolyzing agent, water and solvent is satisfactory.

The reaction may be conducted at a temperature between about zero degrees centigrade and the boiling point of the reaction mixture, temperatures of close to the boiling point being preferred. In practice, the mixture of 3,11β-dihydroxypregnane-20-one-20-ketal, solvent and hydrolyzing agent is usually heated to the boiling point and subsequently permitted to stand at room temperature for several hours. Alternatively, the reaction mixture may be warmed at a somewhat lower temperature for a longer period of time to effect hydrolysis of the 20-ketal group of the steroid compound. In general, the reaction mixture may be permitted to stand for between about one and 24 hours, the exact period depending upon the starting materials employed, the concentration of the hydrolyzing agent and the temperature at which the hydrolysis reaction is conducted.

When hydrolysis of the 11β-hydroxy ketal is substantially complete, the organic solvent is removed by conventional procedure, preferably by evaporation under nitrogen or other inert atmosphere, to yield a residue from which the 3,11β-dihydroxypregnane-20-one can be separated by conventional procedure.

When the novel hydrolysis process of the present invention is carried out in the above-described manner, the yield of 3,11β-dihydroxypregnane-20-one obtained by hydrolysis of a 3,11β-dihydroxypregnane-20-one-20-ketal is substantially quantitative, yields of above 97 percent being consistently obtained.

The following examples are illustrative of the process and compounds of the present invention but are not to be construed as limiting.

PREPARATION 1.—3α-HYDROXYPREGNANE-11,20-DIONE-20-ETHYLENE GLYCOL KETAL

A mixture of 500 milligrams (1.5 millimoles) of 3α-hydroxypregnane-11,20-dione, one milliliter (18.0 millimoles) of ethylene glycol, fifty milligrams of para-toluenesulfonic acid, and fifty milliliters of benzene was refluxed with agitation for six hours. The water which formed was removed by co-distillation with benzene. The benzene solution was washed with water, dried and concentrated. Recrystallization from a solvent mixture of ethyl acetate-hexane hydrocarbons (Skelly Solve B) gave 310 milligrams (0.88 millimole), a 55 percent yield, of crude 3α-hydroxypregnane-11,20-dione-20-ethylene glycol ketal, melting at 131 to 140 degrees centigrade. Upon further recrystallization, a purer product, melting at 142.5–144 degrees centigrade, was obtained.

In the same manner as given in Preparation 1, starting with a 3 - hydroxypregnane - 11,20 - dione and the appropriate alkane diol, the following compounds are prepared: 3β - hydroxypregnane - 11,20 - dione - 20 - ethylene glycol ketal, 3α - hydroxypregnane - 11,20 - dione - 20 - propane-1,2 - diol ketal, 3α - hydroxypregnane - 11,20 - dione - 20-butane - 1,2 - diol ketal, 3α - hydroxypregnane - 11,20-dione - 20 - pentane - 1,2 - diol ketal, 3α - hydroxypregnane - 11,20 - dione - 20 - propane - 1,3 - diol ketal, 3α - hydroxypregnane - 11,20 - dione - 20 - heptane - 2,3 - diol ketal, 3α - hydroxypregnane - 11,20 - dione - 20 - octane - 1,2 - diol ketal, and the like.

*Example 1.—3α,11β - dihydroxypregnane - 20 - one - 20 - ethylene glycol ketal*

To a solution of 500 milligrams (thirteen millimoles) of lithium aluminum hydride in fifty milliliters of ether was added 552 milligrams (1.46 millimoles) of 3α-hydroxypregnane - 11,20 - dione - 20 - ethylene glycol ketal, prepared according to the method of Preparation 1, in fifteen milliliters of benzene. The reaction mixture was stirred for one hour at room temperature and then refluxed for one hour. Cautious addition of ice readily hydrolyzed the reaction mixture. The precipitate and water were extracted with ether and the combined ether solution was concentrated after washing and drying. Recrystallization from a mixed solvent of ethyl acetate-hexane hydrocarbon (Skelly Solve B) gave a yield of 430 milligrams of 3α,11b - dihydroxypregnane - 20 - one - 20-ethylene glycol ketal, melting at 152.5–154 degrees centigrade. The infra-red data confirmed the proposed structure.

*Analysis.*—Percent calculated for $C_{23}H_{38}O_4$: C, 72.97; H, 10.12. Found: C, 72.95; H, 9.96.

*Example 2.—3α,11β - dihydroxypregnane - 20 - one - 20 - propane - 1,2 - diol ketal*

In the manner of Example 1, 3α,11β - dihydroxypregnane - 20 - one - 20 - propane - 1,2 - diol ketal is prepared using 3α - hydroxypregnane - 11,20 - dione - 20 - propane-1,2 - diol ketal instead of 3α - hydroxypregnane - 11,20-dione - 20 - ethylene-glycol ketal.

*Example 3.—3α,11β - dihydroxypregnane - 20 - one - 20 - hexane - 1,2 - diol ketal*

In the manner of Example 1, 3α,11β - dihydroxypregnane - 20 - one - 20 - hexane - 1,2 - diol ketal is prepared using 3α - hydroxypregnane - 11,20 - dione - 20 - hexane-1,2 - diol ketal instead of 3α - hydroxypregnane - 11,20-dione - 20 - ethylene glycol ketal.

*Example 4.—3α,11β - dihydroxypregnane - 20 - one - 20-propane - 1,3 - diol ketal*

In the same manner as given in Example 1, 3α,11β-dihydroxypregnane - 20 - one - 20 - propane - 1,3 - diol ketal is prepared using 3α - hydroxypregnane - 11,20-dione - 20 - propane - 1,3 - diol ketal instead of 3α-hydroxypregnane - 11,20 - dione - 20 - ethylene glycol ketal.

*Example 5.—3α,11β - dihydroxypregnane - 20 - one - 20-octane - 1,2 - diol ketal*

In the same manner as given in Example 1, 3α,11β-dihydroxypregnane - 20 - one - 20 - octane - 1,2 - diol ketal is prepared using 3α - hydroxypregnane - 11,20-dione - 20 - octane - 1,2 - diol ketal instead of 3α - hydroxypregnane - 11,20 - dione - 20 - ethylene glycol ketal.

*Example 6.—3β,11β - dihydroxypregnane - 20 - one - 20-ethylene glycol ketal*

In the same manner as given in Example 1, 3β,11β-dihydroxypregnane - 20 - one - 20 - ethylene glycol ketal is prepared from 3β - hydroxypregnane - 11,20 - dione-20 - ethylene glycol ketal.

*Example 7.—3α,11β - dihydroxypregnane - 20 - one - 20-ethylene glycol ketal*

In the same manner as given in Example 1, 3α,11β-dihydroxypregnane - 20 - one - 20 - ethylene glycol ketal is prepared from 3α - hydroxypregnane - 11,20 - dione-20 - ethylene glycol ketal using sodium borohydride in an isopropyl alcohol-water mixture instead of lithium aluminum hydride in an ether-benzene mixture.

*Example 8.—3α,11β - dihydroxypregnane - 20 - one - 20-ethylene glycol ketal*

In the same manner as given in Example 1, 3α,11β-dihydroxypregnane - 20 - one - 20 - ethylene glycol ketal is prepared from 3α - hydroxypregnane - 11,20 - dione-20 - ethylene glycol ketal using lithium borohydride in an alcohol-water mixture instead of lithium aluminum hydride in an ether-benzene mixture.

In the manner of Examples 1 to 8, starting with the corresponding ketal, the following additional compounds are prepared: 3α,11β - dihydroxypregnane - 20 - one - 20-pentane - 1,3 - diol ketal, 3α,11β - dihydroxypregnane - 20-one - 20 - butane - 1,2 - diol ketal, 3α,11β - dihydroxypregnane - 20 - one - 20 - heptane - 1,2 - diol ketal, 3α,11β-dihydroxypregnane - 20 - one - 3 - methylpentane - 1,2-diol ketal, 3α,11β - dihydroxypregnane - 20 - one - 20-hexane - 2,3 - diol ketal, 3α,11β - dihydroxypregnane - 20-one - 20 - heptane - 3,4 - diol ketal, and the like.

*Example 9.—3α,11β - dihydroxypregnane - 20 - one*

A solution of 100 milligrams (0.25 millimole) of 3α,11β - dihydroxypregnane - 20 - one - 20 - ethylene glycol ketal from Example 1 was admixed with two drops of concentrated sulfuric acid ($H_2SO_4$), two milliliters of water, and ten milliliters of methanol and the resulting mixture was warmed to the boiling point and then permitted to stand at room temperature for four hours. The methanol was evaporated under an atmosphere of nitrogen to give 85 milligrams (a 99 percent yield) of 3α,11β - dihydroxypregnane - 20 - one, melting at 189–198 degrees centigrade. Recrystallization from methanol raised the melting point to 220–223 degrees centigrade. The infra-red analysis confirmed the proposed structure.

*Example 10.—3α,11β - dihydroxypregnane - 20 - one*

A solution of 500 milligrams of 3α,11β - dihydroxypregnane - 20 - one - 20 - ethylene glycol ketal, in a mixture of fifty milliliters of ether and fifteen milliliters of benzene, was stirred vigorously for sixteen hours at room temperature with 65 milliliters of dilute hydrochloric acid. At the end of this time the organic layer was separated, washed with water, dried and concentrated to give a 95 percent yield of 3α,11β - dihydroxypregnane - 20 - one, melting at 190–199 degrees centigrade. Recrystallization from methanol raised the melting point to 219–222 degrees centigrade.

*Example 11.—3α,11β - dihydroxypregnane - 20 - one*

To five-tenths (0.5) millimole of 3α,11β - dihydroxypregnane - 20 - one - 20 - propane - 1,2 - diol ketal, prepared according to the procedure of Example 2, in ten milliliters of ethanol, was added eight drops of concentrated hydrochloric acid (HCl) and eight milliliters of water. The resulting admixture was heated to its boiling point and then permitted to stand for a period of eight hours at about thirty degrees centigrade. The solvent was evaporated under a nitrogen atmosphere to give 3α,11β - dihydroxypregnane - 20 - one, melting at about 189–198 degrees centigrade, in 98 percent yield. Recrystallization from methanol raised the melting point to 220–223 degrees centigrade. The infra-red spectrum confirmed the theoretical structure.

*Example 12.—3α,11β-dihydroxypregnane-20-one*

Following the procedure of Example 9, 3α,11β-dihydroxypregnane-20-one-20-propane-1,3-diol ketal, prepared according to the procedure of Example 4, is hydrolyzed to produce 3α,11β-dihydroxypregnane-20-one, having a melting point of 220–223 degrees centigrade.

*Example 13.—3α,11β-dihydroxypregnane-20-one*

In the same manner as given in Example 9, 3α,11β-dihydroxypregnane-20-one-20-butane-1,2,-diol ketal, prepared according to the procedure of Examples 1 to 8, is hydrolyzed to form 3α,11β-dihydroxypregnane-20-one, having a melting point of 220–223 degrees centigrade.

*Example 14.—3β,11β-dihydroxypregnane-20-one*

Following the procedure outlined in Examples 9 through droxypregnane-20-one-20-ethylene glycol ketal, prepared according to the procedure of Example 6, is hydrolyzed to produce 3β,11β-dihydroxypregnane-20-one, having a melting point of 253–257 degrees centigrade.

Following the procedure outlined in Examples 9 through 14, 3α,11β-dihydroxypregnane-20-one is prepared from other 3α,11β-dihydroxypregnane-20-one-20-ketals, such as, for example, 3α,11β-dihydroxypregnane-20-one-20-pentane-1,2-diol ketal, 3α,11β-dihydroxypregnane-20-one-20-hexane-1,2-diol ketal, 3α,11β-dihydroxypregnane-20-one-20-heptane-2,3-diol ketal, 3α,11β-dihydroxypregnane-20-one-20-octane-1,2-diol ketal, and the like.

It is to be understood that the invention is not to be limited to the exact details of operation or exact compounds shown and described, as obvious modifications and equivalents will be apparent to those skilled in the art, and the invention is therefore to be limited only by the scope of the appended claims.

We claim:

1. A 3-hydroxypregnane-11,20-dione-20-ketal having the following general formula:

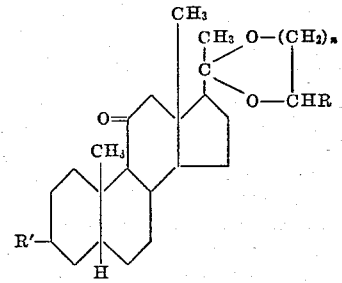

wherein R is selected from the group consisting of hydrogen and lower-alkyl radicals containing from one to six carbon atoms, inclusive, R' is selected from the group consisting of alpha and beta hydroxyl radicals, and $n$ is an integer from one to two, inclusive.

2. 3β-hydroxypregnane-11,20-dione-20-ethylene glycol ketal.

3. 3α-hydroxypregnane-11,20-dione-20-ethylene glycol ketal of the formula:

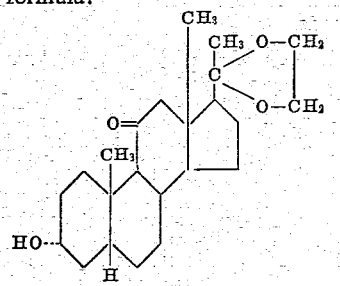

4. 3α-hydroxypregnane-11,20-dione-20-propane-1,2-diol ketal of the formula:

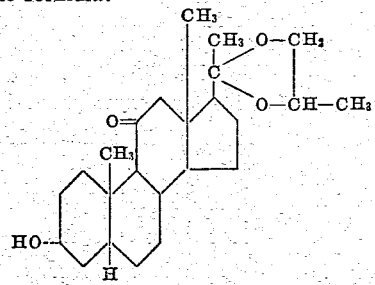

5. 3α-hydroxypregnane-11,20-dione-20-propane-1,3-diol ketal of the formula:

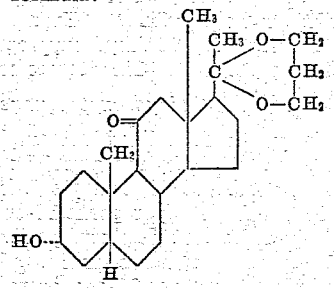

6. A process for the preparation of pregnane-3α,11β-diol-20-one comprising treating pregnane-3α-ol-11,20-dione with ethylene glycol to prepare the corresponding 20-ethylene ketal, selectively reducing the pregnane-3α-ol-11,20-dione-20-ethylene ketal with lithium aluminum hydride to produce pregnane-3α,11β-diol-20-one-ethylene ketal.

7. A process for the preparation of 3,11β-dihydroxypregnane-20-one-20-ketal comprising treating a 3-hydroxypregnane-11,20-dione-20-alkane diol-ketal, wherein the 20-ketal group contains from two to eight carbon atoms, inclusive, with a reducing agent selected from the group consisting of lithium aluminum hydride, sodium borohydride, and lithium borohydride, in a solvent at a temperature below about 100 degrees centigrade, and isolating a 3,11β-dihydroxypregnane-20-one-20-ketal from the reaction product.

8. A process for the preparation of 3,11β-dihydroxypregnane-20-one-20-ethylene glycol ketal comprising treating 3-hydroxypregnane-11,20-dione-20-ethylene glycol ketal with an excess of a reducing agent selected from the group consisting of lithium aluminum hydride, sodium borohydride, and lithium borohydride, in a solvent at a temperature between about zero and about eighty degrees centigrade, and isolating 3,11β-dihydroxypregnane-20-one-20-ethylene glycol ketal from the reaction product.

9. A process for the preparation of 3,11β-dihydroxypregnane-20-one-20-ketal comprising treating a 3-hydroxypregnane-11,20-dione-20-alkane diol ketal, wherein the 20-ketal group contains from two to eight carbon atoms, inclusive, with lithium aluminum hydride in excess of the amount theoretically required, in an organic solvent at a temperature below about 100 degrees centigrade, and isolating a 3,11β-dihydroxypregnane-20-one-20-ketal from the reaction product.

10. A process for the preparation of 3α,11β-dihydroxypregnane-20-one-20-ethylene glycol ketal comprising treating 3α-hydroxypregnane-11,20-dione-20-ethylene glycol ketal with lithium aluminum hydride in excess of the amount theoretically required, in an organic solvent at a temperature below about 100 degrees centigrade, and isolating 3α,11β-dihydroxypregnane-20-one-20-ethylene glycol ketal from the reaction product.

11. A process for the preparation of 3,11β-dihydroxypregnane-20-one-20-ketal comprising treating a 3-hydroxypregnane-11,20-dione-20-alkane diol ketal, wherein the 20-ketal group contains from one to eight carbon atoms, inclusive, with sodium borohydride in excess of the amount theoretically required, in a solvent at a temperature below about 100 degrees centigrade, and isolating a 3,11β-dihydroxypregnane-20-one-20-ketal from the reaction product.

12. A process for the preparation of 3,11β-dihydroxypregnane-20-one-20-ketal comprising treating a 3-hydroxypregnane-11,20-dione-20-alkane diol ketal, wherein the 20-ketal group contains from two to eight carbon atoms, inclusive, with lithium borohydride in excess of the amount theoretically required, in a solvent at a temperature below about 100 degrees centigrade, and isolating a 3,11β-dihydroxypregnane-20-one-20-ketal from the reaction product.

13. A process for the preparation of 3,11β-dihydroxypregnane-20-one comprising treating a 3-hydroxypregnane-11,20-dione-20-alkane diol ketal with a reducing agent selected from the group consisting of lithium aluminum hydride, sodium borohydride and lithium borohydride to produce a 3,11β-dihydroxypregnane-20-one-20-alkane diol ketal, and hydrolyzing the thus-produced 20-alkane diol ketal with an acid hydrolyzing agent to produce 3,11β-dihydroxypregnane-20-one.

14. A process for the preparation of 3,11β-dihydroxypregnane-20-one comprising treating a 3-hydroxypregnane-11,20-dione-20-alkane diol ketal, wherein the 20-ketal group contains from two to eight carbon atoms, inclusive, with a reducing agent selected from the group consisting of lithium aluminum hydride, sodium borohydride, and lithium borohydride, in a solvent at a temperature below about 100 degrees centigrade to produce a 3,11β-dihydroxypregnane-20-one-20-ketal, and hydrolyzing the thus-produced 20-alkane diol ketal with an acid hydrolyzing agent, in an aqueous organic solvent at a temperature between about zero degrees centigrade and the boiling point of the reaction mixture, to obtain 3,11β-dihydroxypregnane-20-one.

15. A process for the preparation of 3,11β-dihydroxypregnane-20-one comprising treating 3-hydroxypregnane-11,20-dione-20-ethylene glycol ketal with an excess of a reducing agent selected from the group consisting of lithium aluminum hydride, sodium borohydride and lithium borohydride, in a solvent at a temperature between about zero and about eighty degrees centigrade, to produce 3,11β-dihydroxypregnane-20-one-20-ethylene glycol ketal, and hydrolyzing the thus-produced 20-ethylene glycol ketal with a mineral acid, in an aqueous organic solvent at a temperature between about zero and the boiling point of the reaction mixture, to obtain 3,11β-dihydroxypregnane-20-one.

References Cited in the file of this patent

UNITED STATES PATENTS

| | | |
|---|---|---|
| 2,288,854 | Stavely | July 7, 1942 |
| 2,302,626 | Koster | Nov. 17, 1942 |
| 2,356,154 | Fernholz | Aug. 22, 1944 |
| 2,378,918 | Fernholz | June 26, 1945 |
| 2,623,885 | Miescher | Dec. 30, 1952 |
| 2,648,662 | Julian | Aug. 11, 1953 |
| 2,648,663 | Julian | Aug. 11, 1953 |

OTHER REFERENCES

Fieser et al.: "Natural Products Related to Phenanthrene," 1949, 3rd ed., page 445.

UNITED STATES PATENT OFFICE
Certificate of Correction

Patent No. 2,824,871                                        February 25, 1958

Robert H. Levin et al.

It is hereby certified that error appears in the printed specification of the above numbered patent requiring correction and that the said Letters Patent should read as corrected below.

Column 6, lines 35 and 36, for "procedure outlined in Examples 9 through droxypregnane-" read —procedure of Example 9, 3β,11β-dihydroxypregnane- —.

Signed and sealed this 11th day of November 1958.

[SEAL]

Attest:
KARL H. AXLINE,
*Attesting Officer.*

ROBERT C. WATSON,
*Commissioner of Patents.*